K. WEBB.
OVEN BOTTOM.
APPLICATION FILED DEC. 26, 1908.
921,762.
Patented May 18, 1909.
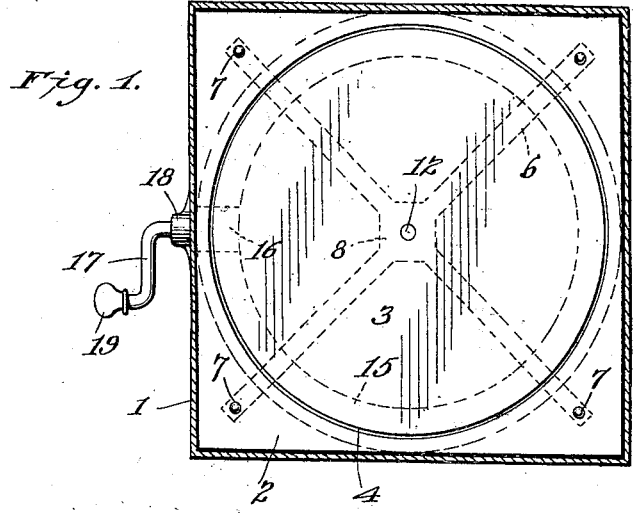
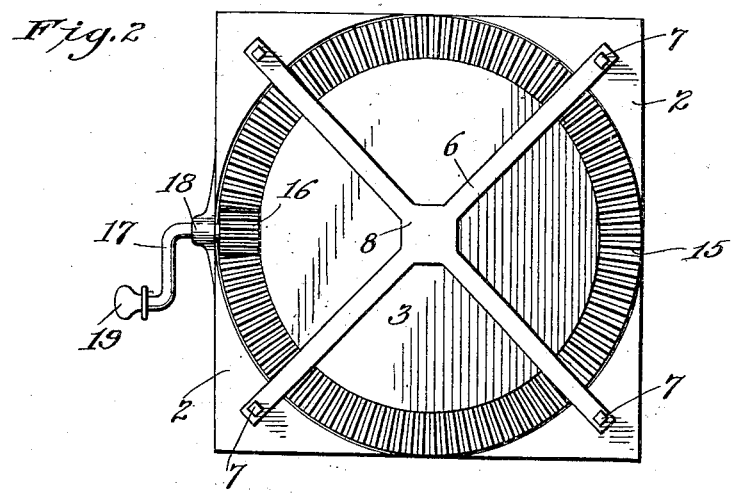
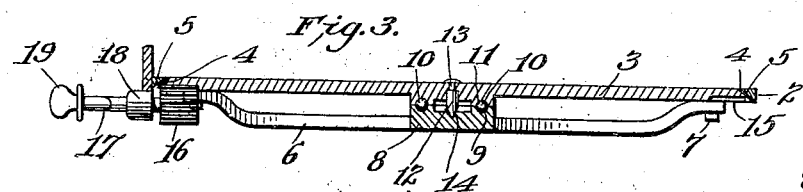
Witnesses
M. C. Lyddane
J. D. L. Mulhall
Inventor
Kate Webb
By Joshua R. H. Potts
Attorney

UNITED STATES PATENT OFFICE.

KATE WEBB, OF WEST CONSHOHOCKEN, PENNSYLVANIA.

OVEN-BOTTOM.

No. 921,762.        Specification of Letters Patent.        Patented May 18, 1909.

Application filed December 26, 1908. Serial No. 469,227.

*To all whom it may concern:*

Be it known that I, KATE WEBB, a citizen of the United States, residing at West Conshohocken, in the county of Montgomery and State of Pennsylvania, have invented certain new and useful Improvements in Oven-Bottoms, of which the following is a specification.

My invention relates to an improved oven bottom, the object of the invention being to provide an improved rotary bottom operated by mechanism outside of the stove, so as to turn the bottom to move cooking utensils thereon throughout the interior of the oven and present them to the opening or door in easy reach.

A further object is to provide improvements of this character of extremely simple construction, which will add but slight cost to the ordinary construction of stoves or bakers' ovens, and which will overcome the necessity for reaching into the oven to remove a cooking utensil, and will enable the manipulation of the cooking utensils within the oven, to move them to various parts of the oven, where they will receive just the proper amount of heat.

With these and other objects in view, the invention consists in certain novel features of construction, and combinations, and arrangements of parts as will be more fully hereinafter described and pointed out in the claim.

In the accompanying drawings, Figure 1, is a top plan view illustrating my improvements. Fig. 2, is a bottom plan view, and Fig. 3, is a view in longitudinal section.

1 represents the wall of the oven proper in which a fixed bottom 2 is secured, and provided with a large circular opening.

My improved rotary oven bottom 3 is located in the opening provided in the fixed bottom 2, and is made with a beveled periphery 4, adjacent to an oppositely beveled edge 5 on the fixed bottom 2, so as to prevent upward movement of the rotary bottom, and consequent displacement thereof.

6 represents a hanger or spider which is secured at its ends to the fixed bottom by means of bolts 7, and is provided at its center with a supporting plate 8. This supporting plate 8 is made with a circular concave runway 9 for a series of ball bearings 10, and the rotary bottom 3 is made with a runway 11 disposed above the runway 9, and running upon the ball bearings 10, so as to provide a ball bearing mounting for said rotary bottom.

A pin 12 is provided with a restricted upper end portion 13, which fits within an opening in the bottom 3, and is riveted or upset within said restricted opening to effectually secure the pin at the center of said bottom, and the lower end of said pin is beveled and has a thrust bearing 14 in the center of the plate 8. This pin 12 serves to prevent lateral wabbling to the rotary bottom, and insures perfect contact of the rotary bottom with its ball bearings 10, and hence provides an easy turning structure.

A circular toothed rack 15, is provided on the under face of the rotary bottom 3, and a pinion 16 is in mesh with said rack, and is secured upon the inner end of a crank shaft 17. The crank shaft 17 is supported in a suitable bearing 18 on the stove wall 1, and is provided with a hand hold or knob 19 at its outer end to facilitate the turning of the crank, and the rotary movement of the bottom 3.

In operation the cooking utensils are placed upon the rotary bottom at the oven door, and the crank 17 is turned so as to revolve the bottom 3 and position the cooking utensils wherever desired within the oven. The cook, can of course, operate the oven bottom to present any of the cooking utensils therein at the door, so that they can be examined or removed without the necessity of reaching in the oven any appreciable distance, and hence obviate the many burns incident to such reaching as is now required in the ordinary construction of fixed oven bottoms.

Slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

In combination with a fixed oven bottom, secured in the corners of the oven, and having a central circular opening, and said fixed bottom made with a beveled edge at said opening on its lower face, a circular rotary oven bottom within said opening flush with the upper face of the fixed oven bottom and having its periphery oppositely beveled to the bevel of the fixed bottom, a spider or hanger secured at its ends to the fixed bottom and located below the rotary bottom, a pin secured centrally in the rotary bottom and having a thrust bearing on the hanger, ball bearings between said rotary bottom and the hanger, a circular rack on said rotary bottom, a crank shaft, an oven wall, a bearing on said oven wall for said crank shaft, and a pinion on said crank shaft meshing with said rack.

In testimony whereof I have signed my name to this specification in the presence of two subscribing witnesses.

KATE WEBB.

Witnesses:
 KATE A. THOMAS,
 J. C. CAKE.